H. NIEMANN.
BELT-FASTENERS.

No. 184,654. Patented Nov. 21, 1876.

WITNESSES
F. L. Durand
C. L. Evert

INVENTOR
Henry Nieman
By J. H. Alexander
Attorney

UNITED STATES PATENT OFFICE.

HENRY NIEMANN, OF YPSILANTI, MICHIGAN.

IMPROVEMENT IN BELT-FASTENERS.

Specification forming part of Letters Patent No. 184,654, dated November 21, 1876; application filed August 3, 1876.

*To all whom it may concern:*

Be it known that I, HENRY NIEMANN, of Ypsilanti, in the county of Washtenaw and State of Michigan, have invented certain new and useful Improvements in Belt-Fastening; and I do hereby declare that the following is a full, clear, and exact description thereof, reference being had to the accompanying drawings, and to the letters of reference marked thereon, which form part of this specification.

The nature of my invention consists in the construction of a belt-fastener, as will be hereinafter more fully set forth.

In order to enable others skilled in the art to which my invention appertains to make and use the same, I will now proceed to describe its construction and operation, referring to the annexed drawing, in which—

Figure 1:
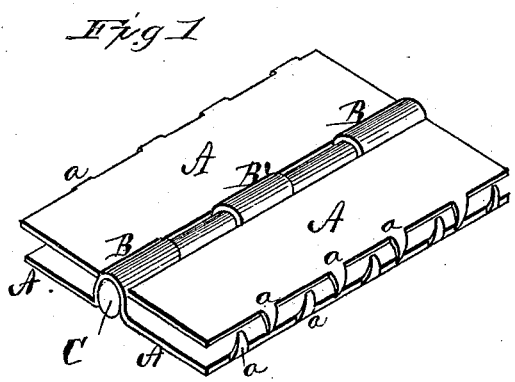
Figure 2:
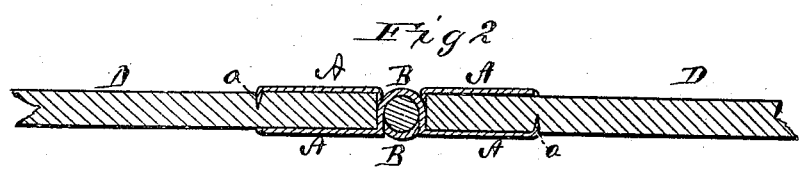
Figure 3:
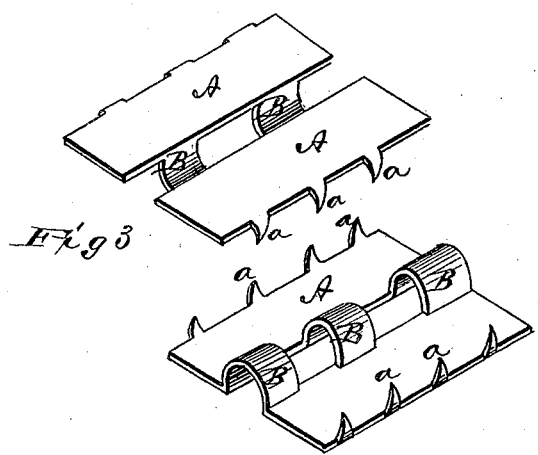

Figure 1 is a perspective view of my belt-fastening. Fig. 2 is a section of the fastening, showing the ends of the belt in position. Fig. 3 shows the parts of the fastening detached.

My belt-fastening is made in two pieces. Each of these pieces is composed of a plate having struck up from the center a series of concavo-convex lugs, B, with openings between them, and along the outer edges of the plates A are formed teeth $a\ a$, to go into the leather or other article used for belt.

The two parts of the belt-fastening are locked together by a bolt, C, passing through the interlocking staples B B, as shown, firmly holding the pieces together with the ends of the belt D between the teeth.

The fastening thus constructed may be made of steel or other hard material of suitable strength.

It will be noticed that the teeth on opposite sides of the belt alternate, and there is an entirely smooth surface on the outside. The tension of the belt holds the bolt C in place.

Having thus fully described my invention, what I claim as new, and desire to secure by Letters Patent, is—

The within-described belt-fastening, composed of the plates A, each having the central concavo-convex struck-up lugs B, and provided with the teeth $a\ a$, and adapted to be secured together by the locking bolt C, substantially as and for the purposes herein set forth.

In testimony that I claim the foregoing as my own I affix my signature in presence of two witnesses.

HENRY NIEMANN.

Witnesses:
EDWARD P. ALLEN,
ANDREW J. CLARK.